Sept. 11, 1956 W. L. SAUVAGO 2,762,674
FISHERMAN'S UTILITY CONTAINER
Filed July 8, 1954 2 Sheets-Sheet 1
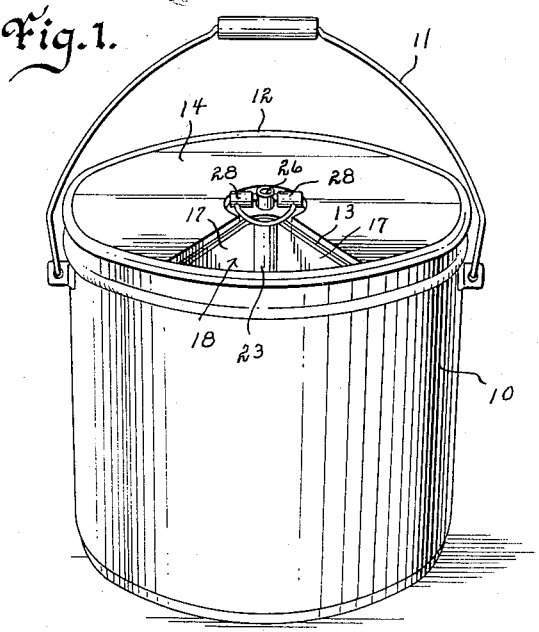
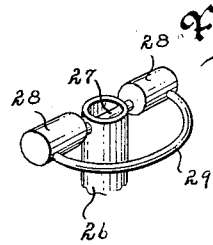
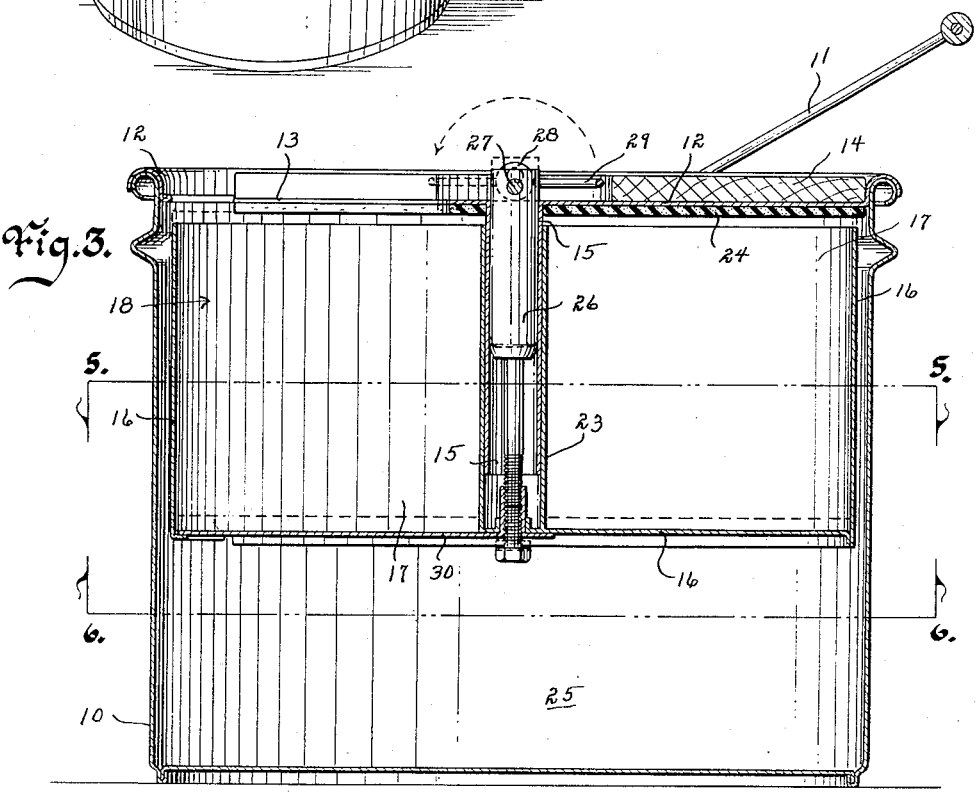
Witness
Edward P. Seeley
Inventor: Willard L. Sauvago
by Talbert Dick & Adler
Attorneys Sept. 11, 1956 W. L. SAUVAGO 2,762,674
FISHERMAN'S UTILITY CONTAINER
Filed July 8, 1954 2 Sheets-Sheet 2
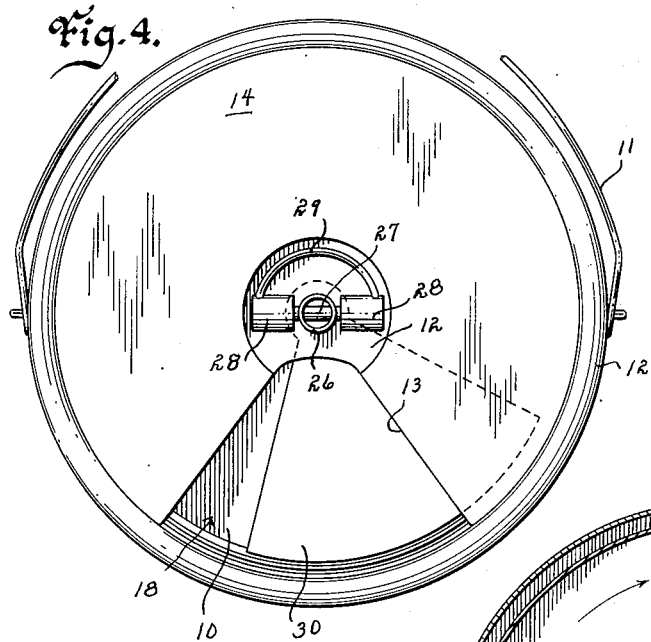
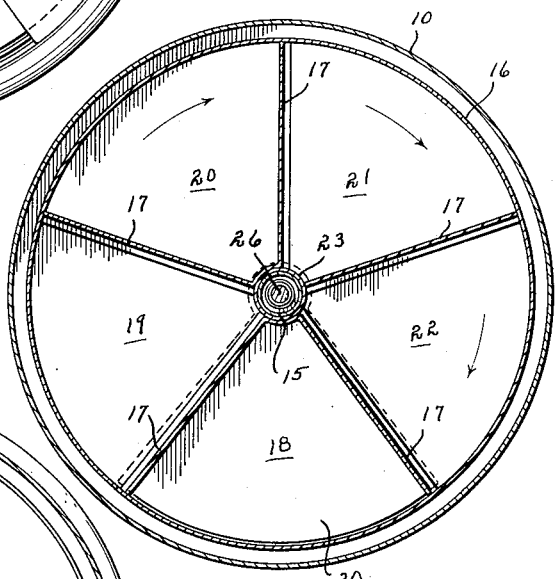
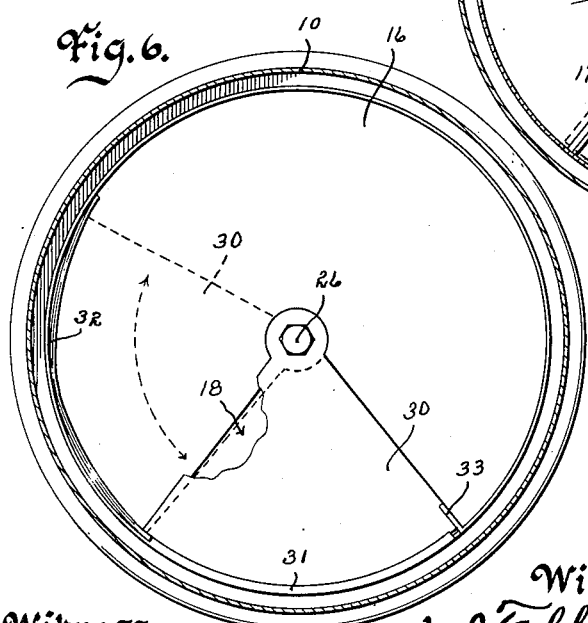
Inventor
Willard L. Sauvago
by Talbert Dick & Adler
Attorneys
Witness
Edward C. Seeley

2,762,674
FISHERMAN'S UTILITY CONTAINER

Willard L. Sauvago, Coon Rapids, Iowa

Application July 8, 1954, Serial No. 442,017

10 Claims. (Cl. 312—305)

This invention relates to a fisherman's utility container and more particularly to a container for holding bait, tackle and the like.

The use of tackle boxes and bait buckets is old. However, the tackle box is not adapted for holding live bait nor water for the live bait. Also the bait bucket is not feasible as a container for holding fishing tackle.

Therefore one of the principal objects of my invention is to provide a container that will successfully hold both bait and fishing equipment.

A further object of this invention is to provide a container that is capable of sealing the tackle compartment or compartments from each other and from water.

A still further object of my invention is to provide a combination tackle and bait container that may be used as a seat by the fisherman.

A still further object of this invention is to provide a tackle container that does not spill the tackle therefrom when the lid is actuated.

Still further objects of my invention are to provide a fisherman's utility container that is economical in manufacture, durable in use, and refined in appearance.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my container ready for use.

Fig. 2 is an enlarged perspective view of the actuating and locking handle means.

Fig. 3 is an enlarged vertical sectional view of my container and more fully illustrates its construction.

Fig. 4 is a top plan view.

Fig. 5 is a horizontal cross-sectional view of the container taken on line 5—5 of Fig. 3, and Fig. 6 is a horizontal sectional view of the container looking upwardly and taken on line 6—6 of Fig. 3.

In these drawings I have used the numeral 10 to designate a bucket having the foldable bail 11. The numeral 12 designates a lid adapted to rest on and over the upper marginal edge of the bucket 10. This lid has a cut away segment 13 as shown in Fig. 4. A wooden or like seat 14 may be secured in the top of the lid as shown in Fig. 1. The numeral 15 designates a pipe extending downwardly from the center of the lid, and having its open top communicating with the top of the lid. The numeral 16 designates a circular tray having radially extending internal walls 17 that divide the tray into compartments 18, 19, 20, 21, and 22 as shown in Fig. 5. Any suitable number of compartments may be provided, however I show five. The numeral 23 designates an upwardly extending tube from the center of the circular tray, and which embraces the lid pipe 15. By this telescoping phase the tube will be both slidable and rotatable on the pipe 15. On the bottom of the lid is a gasket sheet 24. Obviously when the tray is elevated, the top of its rim, and the tops of the partitions therein that are below the gasket will engage the gasket and thereby seal such compartments. The tray is of a height much less than the height of the bucket, so that a space 25 exists in the bottom of the bucket for water, live bait, and the like. There are many means for keeping such water fresh, and the bait alive, and while such means may be employed in connection with my device, they are not a part of this invention. The numeral 26 designates a shaft rotatably and slidably extending through the lid pipe. A horizontal pin 27 extends through the top of the shaft 26. On each end of the pin is an eccentrically secured roller 28 as shown in Fig. 2. A hand bail 29 connects these two rollers, which engage the top of the lid. By throwing this small hand bail 29 in one direction the shaft will be raised relative to the lid, and when thrown in the opposite direction the shaft will be lowered relative to the lid. By attaching the lower end of the shaft to the tray, the operation of the hand bail 29 will raise the tray into engagement with the gasket, or lower the tray to a position free of the gasket. With the tray free of locking and sealing engagement with the gasket, it may be easily rotated within the bucket, and this may be accomplished by twirling the rollers 28, by finger and thumb. Any suitable method may be employed to secure the tray to the shaft. In the drawings I show the bottom of compartment 18 cut away to provide manual access through the tray and to the bottom of the bucket below the tray. The lower end of the shaft is secured to a plate 30. This plate 30 is a segment of a disk and is capable of being rotated to close the bottom of the compartment 18, when desired. By this construction, the shaft is secured against vertical movement relative to the tray, but the tray is permitted free rotation relative to the shaft. Friction will however be such that when the shaft is rotated, the tray will be rotated below the lid. In as much as the plate is secured to the shaft, when it is desired to, move the plate to open or close the bottom of the compartment 18, the tray is manually held against rotation by reaching through the opening 13 with one hand, and rotating the shaft with the other hand. By rotating the shaft, the various compartments will selectively be exposed to the opening 13. A cut away portion in the center of the wood seat provides a depression for the cam rollers and small hand bail as shown in Fig. 4, with the small bail folded downwardly, the top of my container provides an excellent seat for the fisherman.

The fisherman may separate and keep his various classes of fishing gear in the various compartments that are provided. By swinging the small handle bail to a tightening position all of the compartments except the one that happens to be below the lid opening 13 will be hermetically sealed against water which may accidentally come in contact with the container or from water that may be in the live bait area in the bottom portion of the bucket. However, to gain access to any one of the compartments it is merely necessary to throw the handle bail in the opposite direction to release the tray for rotation within the bucket. Some fishermen prefer to keep certain bait in a compartment instead of in the bottom of the bucket. When the compartments are sealed, the entire unit will float and thus easily retrieved if it should accidentally fall into the water. The entire unit may be lifted from the bucket, thus increasing the utility of the entire device.

Any means may be used to support the outer end of the plate 30 such as the flange 31 in the compartment 18 and the rod 32 to the side thereof. A stop means 33 may be used to limit the rotation of the plate in one direction relative to the tray.

Some changes may be made in the construction and arrangement of my fisherman's utility container without departing from the real spirit and purpose of my invention, and it is my intention to cover by my claims, any modified forms of structure or use of mechanical equivalents which may be reasonably included within their scope.

I claim:

1. In a device of the class described, an open top container, a detachable lid on said container having an opening, a vertical shaft slidably and rotably extending through said lid, a tray on the lower end of said shaft, a lever handle means associated with said shaft and said lid capable of raising said shaft and tray relative to said lid for bringing the said tray upwardly to contact and lock on the under side of said lid.

2. In a device of the class described, an open top container, a detachable lid on said container having an opening, a vertical shaft slidably and rotatably extending through said lid, a tray on the lower end of said shaft, a lever handle means associated with said shaft and said lid capable of rotating said shaft and raising said shaft and tray relative to said lid for bringing the said tray upwardly to contact and lock on the under side of said lid.

3. In a device of the class described, an open top container having an opening and a gasket on its under side, a vertical shaft slidably and rotatably extending through said lid, a tray on the lower end of said shaft, a lever handle means associated with said shaft and said lid capable of raising said shaft and tray relative to said lid for bringing the said tray upwardly to contact and lock on the under side of said lid.

4. In a device of the class described, an open top container, a detachable lid on said container having an opening, a vertical shaft slidably and rotatably extending through said lid, a tray on the lower end of said shaft, a lever handle means associated with said shaft and said lid capable of raising said shaft and tray relative to said lid for bringing the said tray upwardly to contact and lock on the under side of said lid; said tray having a closable opening in its bottom.

5. In a device of the class described, an open top container, a detachable lid on said container having an opening, a vertical shaft slidably and rotatably extending through said lid, a tray on the lower end of said shaft, a lever handle means associated with said shaft and said lid capable of raising said shaft and tray relative to said lid for bringing the said tray upwardly to contact and lock on the under side of said lid; said tray having a closable opening in its bottom and said container having an area below said tray.

6. In a device of the class described, an open top container, a detachable lid on said container having an opening, a vertical shaft slidably and rotatably extending through said lid, a tray on the lower end of said shaft, a cam lever handle means associated with said shaft and said lid capable of raising said shaft and tray relative to said lid for bringing the said tray upwardly to contact and lock on the under side of said lid.

7. An open top container, a lid on said container having an opening, a tray having a plurality of vertical compartments rotatably mounted to the under side of said lid and capable of being rotated to selectively bring any one of said compartments into complementary position with the opening in said lid; said tray having one of its compartments with an open bottom, and a movable plate means on said tray for closing the bottom of said compartment having the opening.

8. An open top container, a lid on said container having an opening, a tray having a plurality of vertical compartments rotatably mounted to the under side of said lid and capable of being rotated to selectively bring any one of said compartments into complementary position with the opening in said lid; said tray having one of its compartments with an open bottom, a movable plate means on said tray for closing the bottom of said compartment having the opening, and a handle means operatively connected to said plate means for moving the same over or away from the open bottomed compartment.

9. An open top container, a lid on said container having an opening, a tray having a plurality of vertical compartments rotatably mounted to the under side of said lid and capable of being rotated to selectively bring any one of said compartments into complementary position with the opening in said lid; said tray having one of its compartments with an open bottom, a movable plate means on said tray for closing the bottom of said compartment having the opening, and a manually movable means associated with said plate means and said tray for moving said plate means relative to said tray and for rotating said tray relative to said lid.

10. In a device of the class described, an open top container, a detachable lid on said container having an opening, a vertical shaft rotatably extending through said lid, a tray on the lower end of said shaft, a handle means associated with said shaft and said lid and capable of rotating said tray relative to said lid, and capable of moving said tray out of locked contact with said lid.

References Cited in the file of this patent

UNITED STATES PATENTS

| 1,208,766 | Frederick | Dec. 19, 1916 |
| 2,604,372 | Klinglesmith | July 22, 1952 |
| 2,612,278 | McGuire | Sept. 30, 1952 |
| 2,628,738 | Hilldale | Feb. 17, 1953 |
| 2,651,137 | Sweet | Sept. 8, 1953 |